US012290487B1

(12) United States Patent
Cao

(10) Patent No.: US 12,290,487 B1
(45) Date of Patent: May 6, 2025

(54) RECIPROCATING MASSAGE DEVICE WITH SWING CONFIGURATION

(71) Applicant: Mengxu Cao, Henan (CN)

(72) Inventor: Mengxu Cao, Henan (CN)

( * ) Notice: Subject to any disclaimer, the term of this patent is extended or adjusted under 35 U.S.C. 154(b) by 0 days.

(21) Appl. No.: 18/798,247

(22) Filed: Aug. 8, 2024

(30) Foreign Application Priority Data

Dec. 29, 2023 (CN) ........................ 202323624174.9

(51) Int. Cl.
*A61H 23/02* (2006.01)
*A61H 19/00* (2006.01)

(52) U.S. Cl.
CPC ......... *A61H 23/0263* (2013.01); *A61H 19/00* (2013.01); *A61H 19/34* (2013.01); *A61H 19/44* (2013.01); *A61H 23/0254* (2013.01); *A61H 2201/0153* (2013.01); *A61H 2201/1215* (2013.01); *A61H 2201/149* (2013.01); *A61H 2201/169* (2013.01); *A61H 2201/5025* (2013.01)

(58) Field of Classification Search
CPC ................ A61H 23/0263; A61H 23/02; A61H 23/0254; A61H 23/025; A61H 19/00; A61H 19/40–44; A61H 2201/0153; A61H 2201/1215; A61H 2201/149; A61H 2201/169; A61H 2201/5025; A61H 7/005
See application file for complete search history.

(56) References Cited

U.S. PATENT DOCUMENTS

| | | | | |
|---|---|---|---|---|
| 11,771,619 B1 * | 10/2023 | Yan | A61H 23/0254 | 600/38 |
| 2009/0093673 A1 * | 4/2009 | Lee | A61H 19/44 | 600/38 |
| 2009/0099413 A1 * | 4/2009 | Kobashikawa | A61H 19/44 | 600/38 |
| 2014/0336452 A1 * | 11/2014 | Shahoian | A61H 19/32 | 600/38 |
| 2016/0354277 A1 * | 12/2016 | Fima | A61H 19/44 | |
| 2017/0100303 A1 * | 4/2017 | Kotlov | A61H 21/00 | |
| 2024/0050307 A1 * | 2/2024 | Luo | A61H 19/44 | |
| 2024/0325240 A1 * | 10/2024 | Zhang | A61H 23/0254 | |
| 2024/0342053 A1 * | 10/2024 | Li | A61H 19/44 | |
| 2025/0017814 A1 * | 1/2025 | Li | A61H 19/44 | |

FOREIGN PATENT DOCUMENTS

DE 202024100278 U1 * 3/2024

* cited by examiner

*Primary Examiner* — Tu A Vo
*Assistant Examiner* — Kelsey E Baller

(57) ABSTRACT

A reciprocating massage device with swing configuration, including a massage body and a rubber sleeve, the rubber sleeve is provided at outside of the massage body. The massage body includes a gripping part, a first massage component, a reciprocating component, a second massage component, an extension and a third massage component. A impact head can be dissembled and replace, which is convenient for users to replace different shapes of the impact head according to the massage demand, and also can be replaced when it is damaged. By setting the reciprocating component to cooperate with the second massage component, the massage device can combine reciprocating massage and telescopic massage.

13 Claims, 7 Drawing Sheets

RECIPROCATING MASSAGE DEVICE WITH SWING CONFIGURATION

TECHNICAL FIELD

The present application relates to the technical field of massagers, and specifically to a reciprocating massage device with swing configuration.

BACKGROUND

Massage devices are a device used to massage users, so as to relax their bodies and mind, and provide a sense of comfort. The existing massage devices have a simple structure, which are generally through a built-in vibration motor to generate vibration to the users to play a role in massage. Some of the massage devices can combine a telescopic massage structure and a reciprocating massage structure, but in order to realize the work of this two structures generally require two motors to be controlled separately, which leads to the overall volume of the massage devices is larger.

There are also some other massage devices on the market with impact structure, the impact structure can further point-to-point massage on the users to enhance the massage effect. However after the market test, the way of massaging the users by means of the vibration motor to produce a vibration effect, its massage effect is not significant enough, and the users need a long time to use the massage devices to achieve a soothing effect. For such traditional massage devices with the impact structure, the impact structure is generally integrated with the massage device, causing the impact head not being easy maintenance and replacement when it is damaged.

Based on above, the present disclosure proposes a message device that can effectively enhance the user's massage comfort and also have a replaceable impact structure.

SUMMARY

The present disclosure aims to provide a reciprocating massage device with swing configuration to address problems mentioned in the background.

To achieve above objectives, the present disclosure adopts the following technical solutions. In some embodiments of the present disclosure, a reciprocating massage device with swing configuration is provided, including a massage body and a rubber sleeve, the rubber sleeve is provided at outside of the massage body. Herein the massage body includes a gripping part, a first massage component for impact vibration, a reciprocating component, a second massage component for telescoping, an extension and a third massage component. The first massage component is provided on a top of the gripping part, the reciprocating component is fitted inside the gripping part, the second massage component is provided on one end of the reciprocating component, the extension is connected with the second massage component, and the third massage component is connected with the extension.

As some preferred embodiments of the present disclosure, the gripping part includes two gripping housings and two first mounting housings. The first mounting housings are provided on one end of the gripping housings, the two gripping housings are mounted to form a gripping handle, and the two first mounting housings are mounted to form a fix tube. The first mounting housings are provided with first elongated slots at sides, the first mounting housings are opened with half-arc troughs at tops and bottoms, and the half-arc troughs at tops and bottoms are connected to form second elongated slots running through therein after the two first mounting housings being mounted for connection.

As some preferred embodiments of the present disclosure, the first massage component includes second mounting housings mounted on tops of the two gripping housings respectively, and a drive motor is provided between two second mounting housings. And an output shaft of the drive motor is fixedly connected to an eccentric wheel, the eccentric wheel is connected to one end of a chain bar, and the other end of the chain bar extends to outside and is connected with an impact head.

As some preferred embodiments of the present disclosure, the two gripping housings, the two first mounting housings, and the two second mounting housings are fixed by screws, respectively.

As some preferred embodiments of the present disclosure, the eccentric wheel is provided with a connecting rod at surface, the chain bar is provided with a connector at one end, and the connector is opened with a first mounting hole in middle. The connecting rod is rotationally connected with the first mounting hole, the chain bar is provided with a plug connector at the other end, the impact head is provided with a plug hole at one end, and the plug connector is mounted in the plug hole.

As some preferred embodiments of the present disclosure, a guiding hole is formed at ends after the two second mounting housings being connected, the chain bar is provided with a guiding portion on surface, and the guiding portion is inserted in the guiding hole.

As some preferred embodiments of the present disclosure, the impact head is, but not limited to, tongue-shaped or ball-shaped.

As some preferred embodiments of the present disclosure, the reciprocating component includes a reciprocating screw mounted between the two first mounting housings, one end of the reciprocating screw is connected with a reducer, the reducer is fixedly connected with an output shaft of a servo motor, and the servo motor is provided between the two gripping housings. The reciprocating screw is provided with a screw nut on surface, the screw nut is fixedly attached to first joint pins at both sides, and the screw nut is fixedly attached to second joint pins at top and bottom. The fix tube is externally sleeved with a reciprocating ring, the first joint pins and the second joint pins are connected with the reciprocating ring through corresponding first elongated slot and second elongated slot, respectively.

As some preferred embodiments of the present disclosure, the reciprocating ring includes two half-ring bodies, the two half-ring bodies are provided with first insert rods and first sockets staggered at ends, and second sockets are opened in middle of end of the half-ring bodies. The second joint pins are provided with second insert rods at both sides, the first insert rods are inserted into the first sockets, and the second insert rods are inserted into the second sockets to make the two half-ring bodies forming a complete loop.

As some preferred embodiments of the present disclosure, the half-ring bodies are provided with installation blocks at inner walls, the installation blocks are provided with slots on surfaces, and the first joint pins are opened with first screw holes at one end, the first joint pins are inserted into the slots. The half-ring bodies are provided with second screw holes running through the slots on sides, the first screws hole and the second screw holes are internally threaded with fixed screws.

As some preferred embodiments of the present disclosure, the second massage component includes a fixed base fixedly mounted to one end of the fix tube. The fixed base is provided with a telescopic block at one end, an installation chamber is provided inside the telescopic block, and a fixed housing is slidably provided in the installation chamber. One end of the fixed housing is fixedly connected with the fixed base, a drive screw is provided in the fixed housing, the drive screw is opened with a second mounting hole at one end, and one end of the reciprocating screw passes through the fixed base to fixedly connect with the second mounting hole. Bottom of the fixed base is opened with a guide groove running through therein, a guide bar is provided on bottom of the installation chamber, and the guide bar is slidingly connected with the guide groove. The guide bar is provided with a roll groove at top, balls are provided in the roll groove, and the balls pass through the guide groove to rolling connect with a threaded groove on surface of the drive screw.

As some preferred embodiments of the present disclosure, the telescopic block is provided with location holes at both sides, the fixed base is fixedly connected with locating rods at both sides, and the locating rods are interspersed with the location holes for connection.

As some preferred embodiments of the present disclosure, the extension is opened with a first mounting groove and a second mounting groove respectively at both ends, and the telescopic block is inserted into the first mounting groove. The third massage component includes a protective cover and a vibration motor, the vibration motor is provided in the protective cover, and the protective cover is inserted into the second mounting groove.

As some preferred embodiments of the present disclosure, the gripping handle is provided with three openings on surface, a battery and a PCB board are provided in the gripping handle, and the vibration motor, the servo motor and the drive motor are electrically connected to the PCB board respectively. The PCB board is provided with three control buttons on surface corresponding to the openings, and the three control buttons are configured to control the vibration motor, the servo motor, and the drive motor respectively.

As some preferred embodiments of the present disclosure, the rubber sleeve is provided with three control keys on surface where located on the gripping part, and the three control keys correspond to three openings respectively.

As some preferred embodiments of the present disclosure, the rubber sleeve is made of non-toxic medical silicone, and the extension and the impact head are made of silicone.

The reciprocating massage device with swing configuration of the present disclosure has at least the following advantages and beneficial effects compared to the existing technologies.

By setting the reciprocating component, to make the reciprocating ring reciprocate in a direction of the reciprocating screw, and due to the rubber sleeve is disposed on the outside of the massage body, so that the protrusion of the rubber sleeve on the surface of the reciprocating ring is able to reciprocate, thereby enabling a user to be massaged.

By setting the reciprocating screw, to make the second massage component be able to perform a telescopic motion, and in the process of the telescopic motion, the third massage component is able to perform a stretching message to the user under the action of the extension. Moreover, the vibration motor in the third massage component will generate vibrations when working, which in turn enables a vibration massage to be performed on the user at the end of the massage device.

By setting the first massage component, it is possible to perform an impact massage on the user, and the impact head can be disassembled and replaced, so that when the impact head is damaged, it can be replaced and maintained, which can enhance the service life of the massage device, and the user also can replace the impact head of the different shapes according to the demand of massage to achieve different massage effects.

By cooperation setting the first massage component, the second massage component, and the third massage component, the comfort of the user's massage can be effectively improved. Moreover, the first massage component, the second massage and the third massage component can be individually controlled, thus making the massage device have a variety of massage modes, and improving the practicality of the massage device.

By setting the servo motor, it can synchronously drive the rotation of the reciprocating screw and the drive screw, so that the single servo motor can drive the reciprocating component and the second massage component at the same time, so as to realize a working effect of one to two. Moreover, this method not only can reduce the cost of machinery manufacturing, but also can make the structure between the reciprocating component and the second massage component more compact, thereby effectively reducing the volume of the whole massage device.

BRIEF DESCRIPTION OF THE DRAWINGS

The accompanying drawings are used to provide a further understanding of the reciprocating massage device with swing configuration of the present disclosure and form a part of the specification, are used in conjunction with the embodiments of the present disclosure for the purpose of explaining the present invention and do not constitute a limitation of the present invention.

Figure 1:
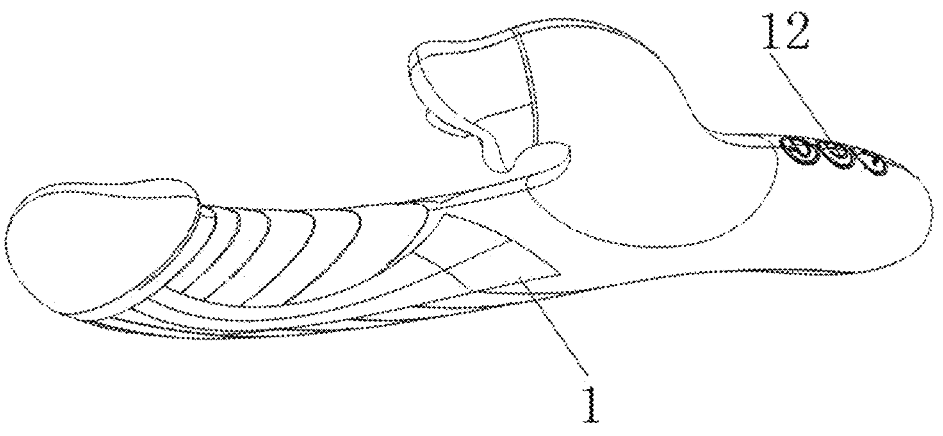
FIG. 1 shows a structural schematic diagram of a reciprocating massage device with swing configuration in accordance with some embodiments of the present disclosure.

In the drawings, reference signs are as follows.

1. Rubber sleeve.

2. Gripping part, 21. Gripping housing, 22. First mounting housing, 23. Gripping handle, 24. Fix tube, 25. First elongated slot, 26. Half-arc trough, 27. Second elongated slot.

3. First massage component, 31. Second mounting housing, 32. Drive motor, 33. Eccentric wheel, 34. Chain bar, 35. Impact head, 26. Connecting rod, 37. Connector, 38. First mounting hole, 39. Plug connector, 310. Plug hole, 311. Guiding portion.

4. Reciprocating component, 41. Reciprocating screw, 42. Servo motor, 43. Screw nut, 44. First joint pin, 45. Second joint pin, 46. Half-ring body, 47. First insert rod, 48. First socket, 49. Second socket, 410. Second insert rod, 411. Installation block, 412. Slot, 413. First screw hole, 414. Second screw hole.

5. Second massage component, 51. Fixed base, 52. Telescopic block, 53. Installation chamber, 54. Fixed housing, 55. Drive screw, 56. Second mounting hole, 57. Guide groove, 58. Guide bar, 59. Roll groove, 510. Balls, 511. Location hole, 512. Locating rod.

6. Extension, 61. First mounting groove, 62. Second mounting groove.

7. Third massage component, 71. Protective cover, 72. Vibration motor.

8. Guiding hole, 9. Opening, 10. Battery, 11. PCB board, 12. Control key.

DETAILED DESCRIPTION OF THE EMBODIMENTS

The technical solutions in the embodiments of the present disclosure will be clearly and completely described below in conjunction with the accompanying drawings, and it is clear that the described embodiments are only a part of the embodiments of the present disclosure and not all of the embodiments. Base on the embodiments in the present disclosure, all other embodiments obtained by a person of ordinary skill in the art without creative labor shall fall within the scope of protection of the present invention.

Referring to FIG. 1 to FIG. 10, in some embodiments of the present disclosure, a reciprocating massage device with swing configuration is provided, including a massage body and a rubber sleeve 1, the rubber sleeve 1 is provided at outside of the massage body. Herein the massage body includes a gripping part 2, a first massage component 3 for impact vibration, a reciprocating component 4, a second massage component 5 for telescoping, an extension 6 and a third massage component 7. The first massage component 3 is provided on a top of the gripping part 2, the reciprocating component 4 is fitted inside the gripping part 2, the second massage component 5 is provided on one end of the reciprocating component 4, the extension 6 is connected with the second massage component 5, and the third massage component 7 is connected with the extension 6.

Figure 3:
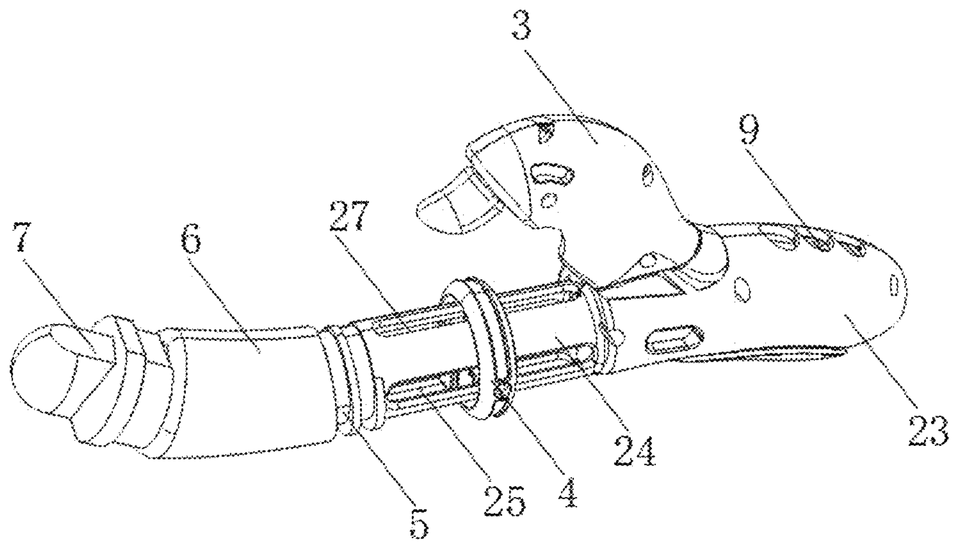
FIG. 3 shows a structural schematic diagram of a massage body in accordance with some embodiments of the present disclosure.
Figure 4:
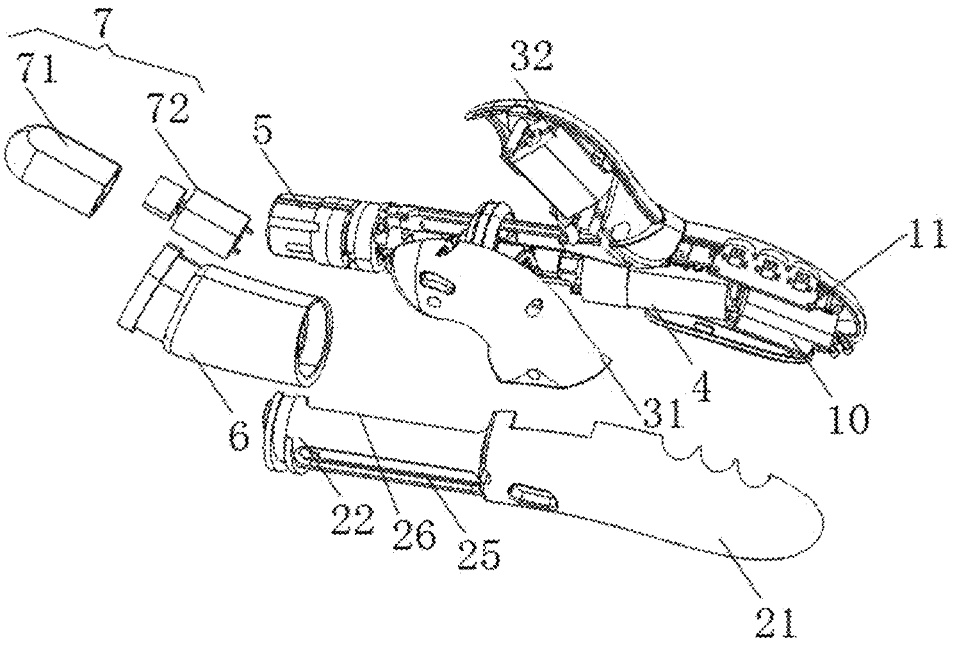
FIG. 4 shows an exploded view of the massage body in accordance with some embodiments of the present disclosure.

Referring to FIG. 3 and FIG. 4, in the embodiments of the present disclosure, the gripping part 2 includes two gripping housings 21 and two first mounting housings 22. The first mounting housings 22 are provided on one end of the gripping housings 21, the two gripping housings 21 are mounted to form a gripping handle 23, and the two first mounting housings 22 are mounted to form a fix tube 24. The first mounting housings 22 are provided with first elongated slots 25 at sides, the first mounting housings 22 are opened with half-arc troughs 26 at tops and bottoms, and the half-arc troughs 26 at tops and bottoms are connected to form second elongated slots 27 running through therein after the two first mounting housings 22 being mounted for connection.

Specifically, the gripping housings and the first mounting housing 22 are fixed to form the gripping handle 23 and the fix tube 24, the gripping handle 23 can facilitate the holding of the massage device by a user, and the reciprocating component 4 is conveniently mounted in the fix tube 24. Moreover, by setting the first elongated slots 25 and the second elongated slots, which is conveniently to act as a guide for the movement of the reciprocating component 4.

Referring to FIG. 2 to FIG. 5, in the embodiments of the present disclosure, the first massage component includes second mounting housings 31 mounted on tops of the two gripping housings 21 respectively, and a drive motor 32 is provided between two second mounting housings 31. An output shaft of the drive motor 32 is fixedly connected to an eccentric wheel 33, the eccentric wheel 33 is connected to one end of a chain bar 34, and the other end of the chain bar 34 extends to outside and is connected with an impact head 35.

Specifically, the drive motor 32 is driven to rotate by the drive motor 32, causing the eccentric wheel 33 to drive the chain bar 34 to reciprocate, thereby driving the impact head 35 through the chain bar 34 to perform an impact massage on a specified portion of the user.

In the embodiments of the present disclosure, the two gripping housings 21, the two first mounting housings 22, and the two second mounting housings 31 are fixed by screws, respectively.

Specifically, the gripping housings 21 and the first mounting housing 22 are secured by means of screws fixing, so as to facilitate the disassembly of the gripping housings 21 and the first mounting housing 22 in such way, and to make it easier to maintain this internally mounted structure.

Referring to FIG. 2 to FIG. 5, the eccentric wheel 33 is provided with a connecting rod 36 at surface, the chain bar 34 is provided with a connector 37 at one end, and the connector 37 is opened with a first mounting hole 38 in middle. The connecting rod 36 is rotationally connected with the first mounting hole 38, the chain bar 34 is provided with a plug connector 39 at the other end, the impact head 35 is provided with a plug hole 310 at one end, and the plug connector 39 is mounted in the plug hole 310.

Specifically, the drive motor 32 drives the eccentric wheel 33 to rotate, and due to the connecting rod 36 is rotationally connected to the first mounting hole 38, the chain bar 34 is made to reciprocate under the action of the eccentric wheel 33, thereby making the chain bar 34 drive the impact head 35 to perform the impact massage on the specified portion of the user, and enhancing the comfort of the user. Moreover, by setting the plug hole 310 make the impact head 35 easy to replace, this in turn makes it easy to replace the impact head 35 when it is damaged, and it is also possible to replace the impact head 35 with different shapes so as to provide different massage effects on the user.

Figure 5:
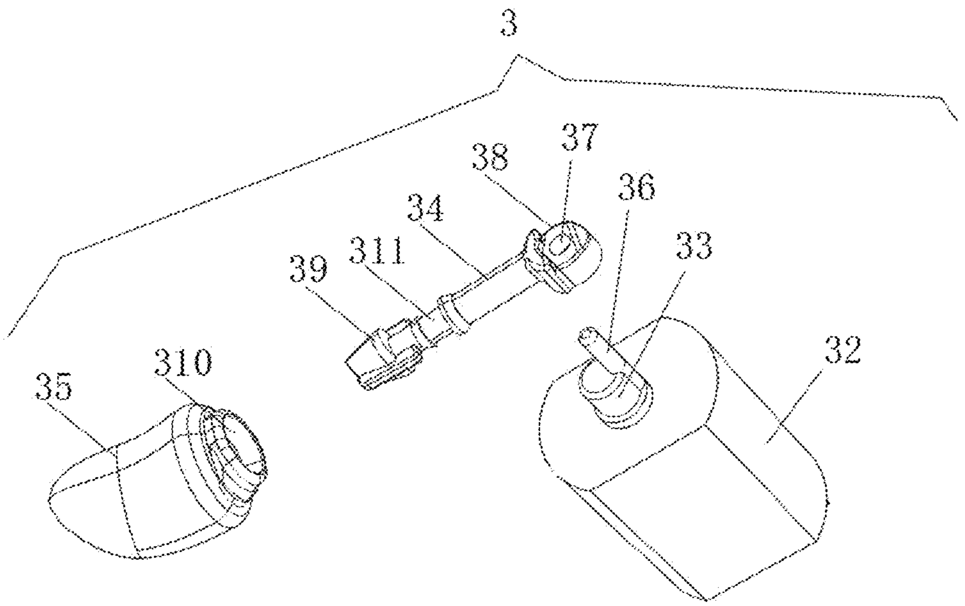
FIG. 5 shows an exploded view of a first massage component in accordance with some embodiments of the present disclosure.
Figure 7:
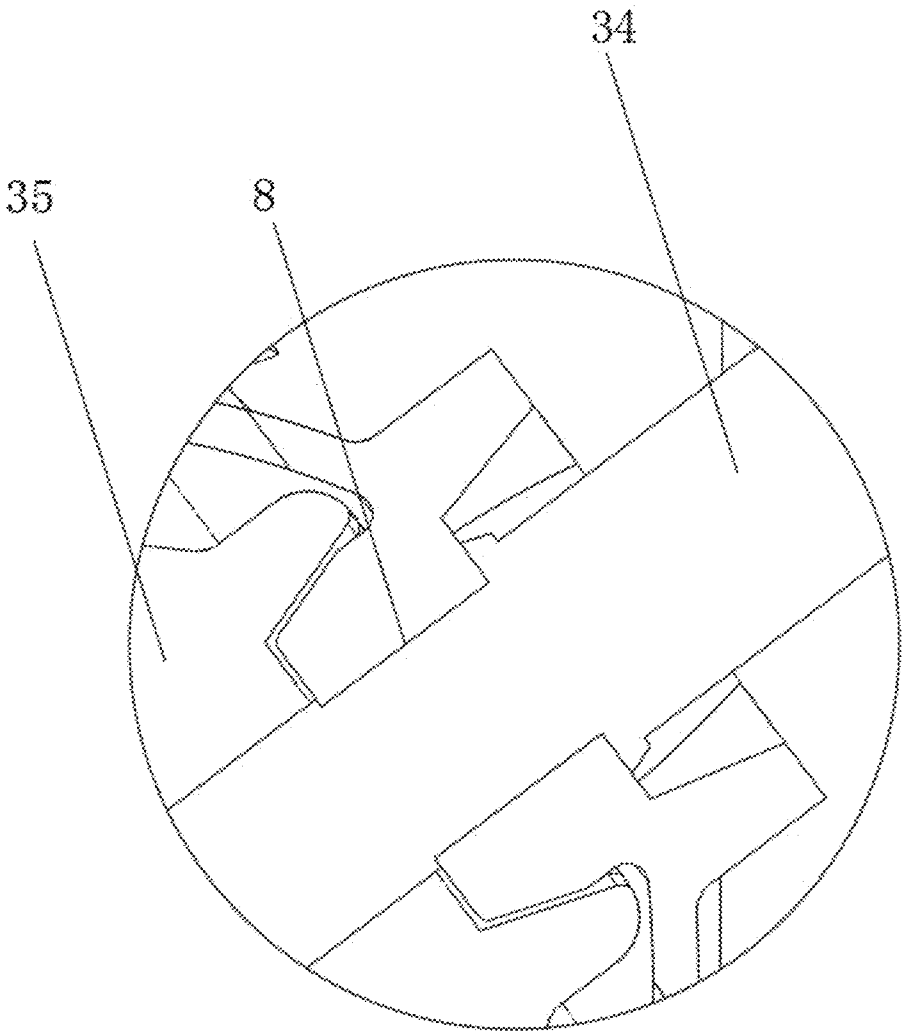
FIG. 7 shows an enlarged structure schematic diagram at A of FIG. 2.

Referring to FIG. 5 and FIG. 7, in the embodiments of the present disclosure, a guiding hole 8 is formed at ends after the two second mounting housings 31 being connected, the chain bar 34 is provided with a guiding portion 311 on surface, and the guiding portion 311 is inserted in the guiding hole 8.

Specifically, after the installation of the two second mounting housings 31 are completed, the guiding hole 8 is form at the end. And by setting the guiding hole 8 to cooperate with the guiding portion 311 on the surface of the chain bar 34, to make the chain bar 34 reciprocate in the guide hole 8. In this process, the chain bar 34 drives the impact head 35 to massage the user's massage area, thereby enhancing the comfort of the user.

In the embodiments of the present disclosure, the impact head is, but not limited to, tongue-shaped or ball-shaped.

Specifically, by replacing the impact head 35 with different shapes, the impact head 35 can provide different impact massage effects on the specified portion of the user, which can make the user get different comfort sensations.

Referring to FIG. 2, FIG. 3, FIG. 4 and FIG. 6, in the embodiments of the present disclosure, the reciprocating component 4 includes a reciprocating screw 41 mounted between the two first mounting housings 22, one end of the reciprocating screw 41 is connected with a reducer, the reducer is fixedly connected with an output shaft of a servo motor 42, and the servo motor 42 is provided between the two gripping housings 21. The reciprocating screw 41 is provided with a screw nut 43 on surface, the screw nut 43 is fixedly attached to first joint pins 44 at both sides, and the screw nut 43 is fixedly attached to second joint pins 45 at top and bottom. The fix tube 24 is externally sleeved with a reciprocating ring, the first joint pins 44 and the second joint pins 45 are connected with the reciprocating ring through corresponding first elongated slot 25 and second elongated slot 27, respectively.

Specifically, the servo motor 42 drives the reciprocating screw 41 to rotate, so that the screw nut 43 moves back and forth in the direction of the reciprocating screw 41. Moreover, by setting the first joint pins 44 and the second joint pins 45 to cooperate with the first elongated slots 25 and the second elongated slots 27, this can play a guiding role for the movement of the reciprocating ring, and the reciprocating ring will lift up the rubber sleeve 1 to create a circular protrusion, so that the reciprocating ring can effectively massage the user through the resulted circular protrusion when moving back and forth.

Figure 6:
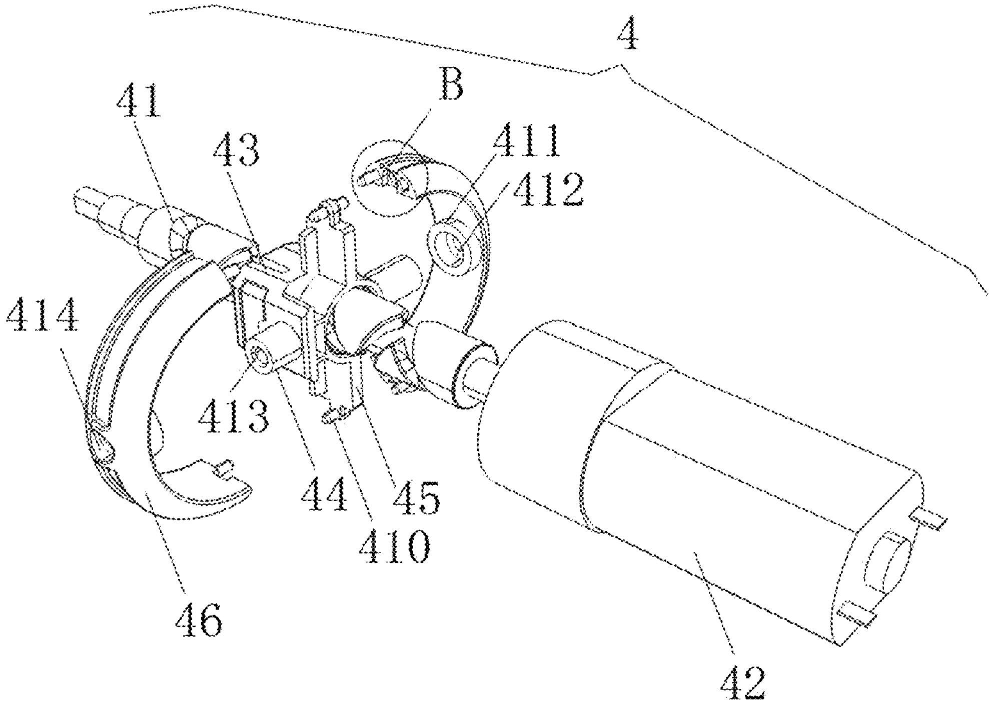
FIG. 6 shows an exploded view of a reciprocating component in accordance with some embodiments of the present disclosure.
Figure 9:
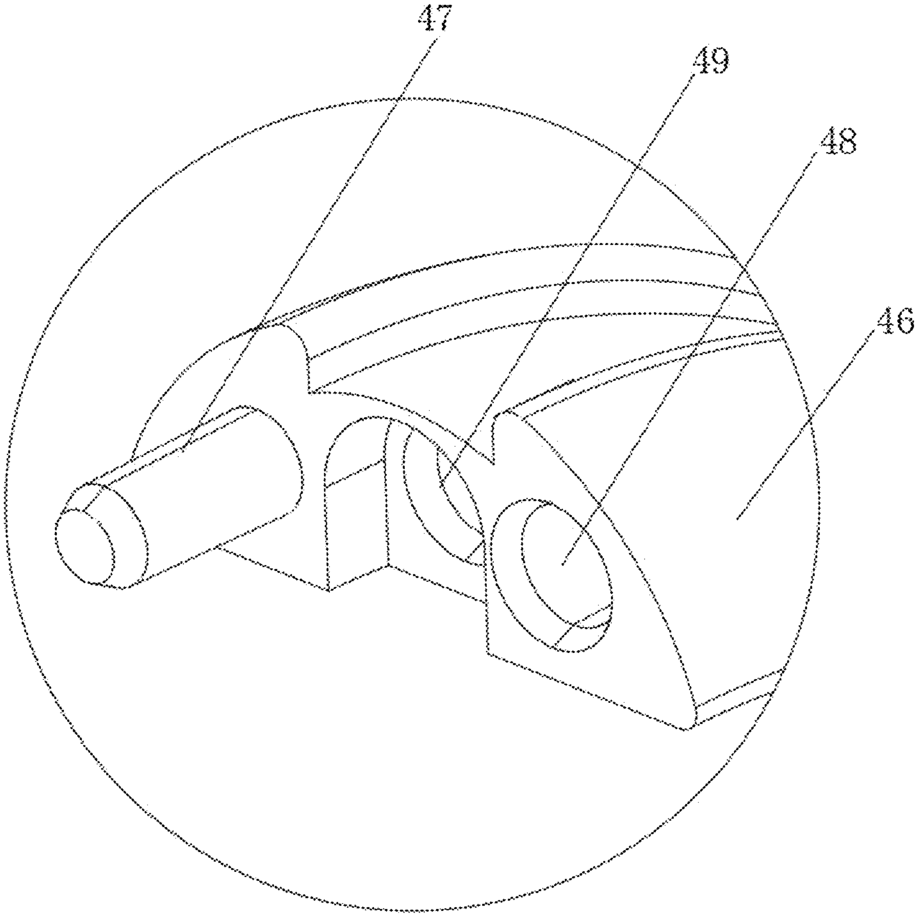
FIG. 9 shows an enlarged structure schematic diagram at B of FIG. 6.

Referring to FIG. 6 and FIG. 9, in the embodiments of the present disclosure, the reciprocating ring includes two half-ring bodies 46, the two half-ring bodies 46 are provided with first insert rods 47 and first sockets 48 staggered at ends, and second sockets 49 are opened in middle of end of the half-ring bodies 46. The second joint pins 45 are provided with second insert rods 410 at both sides, the first insert rods 47 are inserted into the first sockets 48, and the second insert rods 410 are inserted into the second sockets 49 to make the two half-ring bodies 46 forming a complete loop.

Specifically, by setting the first insert rods 47 to cooperate with the first sockets 48 and setting the second insert rods 410 to cooperate with the second sockets 49, the two half-ring bodies 46 are thus conveniently mounted to form the reciprocating ring, and the two half-ring bodies 46 can be disassembled in such way, thereby facilitating disassembly and maintenance.

Referring to FIG. 6, in the embodiments of the present disclosure, the half-ring bodies 46 are provided with installation blocks 411 at inner walls, the installation blocks 411 are provided with slots 412 on surfaces, and the first joint pins 44 are opened with first screw holes 413 at one end, the first joint pins 44 are inserted into the slots 412. The half-ring bodies 46 are provided with second screw holes 412 running through the slots 412 on sides, the first screw holes 413 and the second screw holes 414 are internally threaded with fixed screws.

Specifically, the first joint pins 44 is inserted into the slots 412, and at the same time, the first insert rods 47 and the first sockets 48, the second insert rods 410 and the second sockets 49, are aligned respectively. In this way, the two half-ring bodies 46 can be assembled easily and quickly, and the half-ring bodies 46 are fixed by means of fixing bolts threaded on the first screw holes 413 and the second screw holes 414, which makes it possible to disassemble the half-ring bodies 46, thereby facilitating disassembly and maintenance of the reciprocating component 4.

Figure 2:
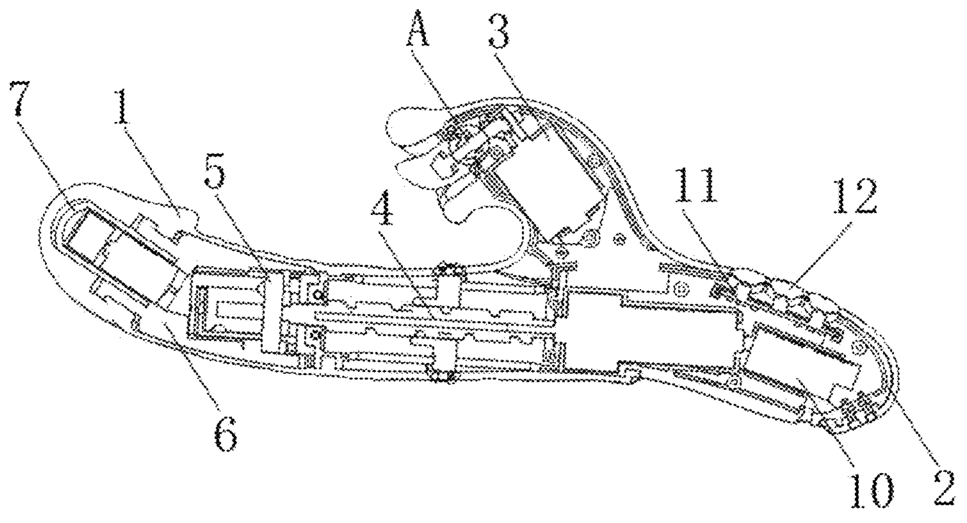
FIG. 2 shows a sectional structure schematic diagram of the reciprocating massage device with swing configuration in accordance with some embodiments of the present disclosure.
Figure 8:
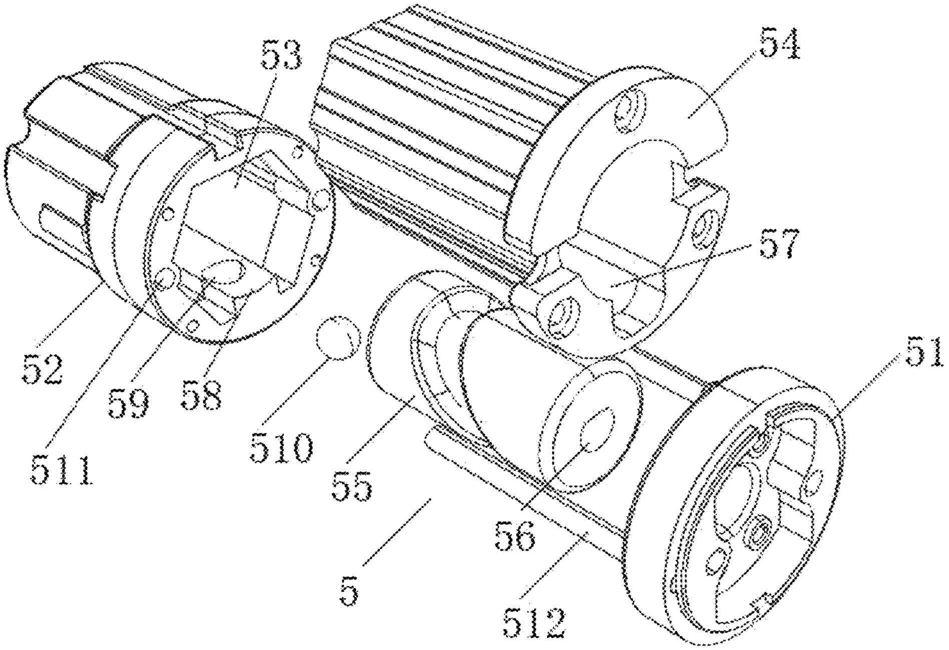
FIG. 8 shows a structural schematic diagram of a second massage component with some embodiments of the present disclosure.

Referring to FIG. 2, FIG. 4 and FIG. 8, in embodiments of the present disclosure, the second massage component 5 includes a fixed base 51 fixedly mounted to one end of the fix tube 24. The fixed base 51 is provided with a telescopic block 52 at one end, an installation chamber 53 is provided inside the telescopic block 52, and a fixed housing 54 is slidably provided in the installation chamber 54. One end of the fixed housing 54 is fixedly connected with the fixed base 51, a drive screw 55 is provided in the fixed housing 54, the drive screw 55 is opened with a second mounting hole 56 at one end, and one end of the reciprocating screw 41 passes through the fixed base 51 to fixedly connect with the second mounting hole 56. Bottom of the fixed base 54 is opened with a guide groove 57 running through therein, a guide bar 58 is provided on bottom of the installation chamber 53, and the guide bar 58 is slidingly connected with the guide groove 57. The guide bar 58 is provided with a roll groove 59 at top, balls 59 are provided in the roll groove 510, and the balls 510 pass through the guide groove 57 to rolling connect with a threaded groove on surface of the drive screw 55.

Specifically, because one end of the reciprocating screw 41 passes through the fixed base 51 to fix with the second mounting hole 56, the rotation of the reciprocating screw 41 can drive the drive screw 55 to rotate, and the when the drive screw 55 is rotating, the telescopic block 52 is able to reciprocate telescopic motion along the fixed housing 54 by means of the balls 510, thus realizing that the servo motor 42 drives the reciprocating ring and the telescopic block 52 are in a synchronized reciprocating motion. And by setting the guide bar 58 to cooperate with the second guide groove 57, it can play a guiding role for the moving direction of the telescopic block 52, and also the servo motor can drive the reciprocating screw and the drive screw to rotate at the same time, so as to realize the synchronous movement of the reciprocating ring and the telescopic block, thus realizing the function of "one drag two". In this way, it can effectively reduce the manufacturing cost of the massage device, and can make the structure between the reciprocating component and the second massage more compact, thereby effectively reducing the overall volume of the massage device.

Referring to FIG. 8, in embodiments of the present disclosure, the telescopic block 52 is provided with location holes 511 at both sides, the fixed base 51 is fixedly connected with locating rods 512 at both sides, and the locating rods 512 are interspersed with the location holes 511 for connection.

Specifically, by setting the locating rods 512 to cooperate with the location holes 511, which can further play the guiding role in the direction of the reciprocating movement of the telescopic block 52, thereby improving the stability of the reciprocating movement of the telescopic block 52.

Figure 10:
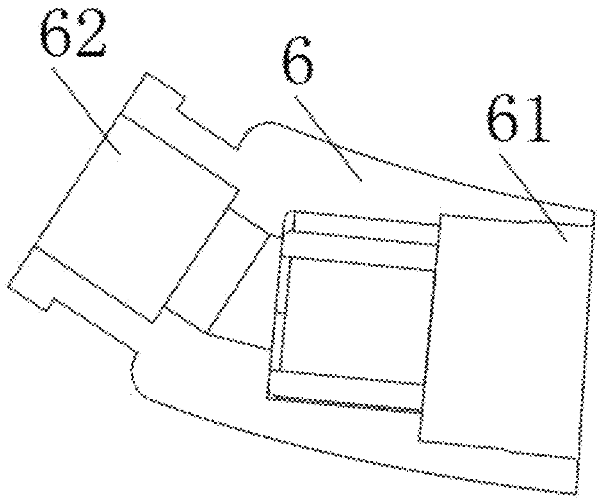
FIG. 10 shows a sectional structure schematic diagram of an extension in accordance with some embodiments of the present disclosure.
Figure 11:
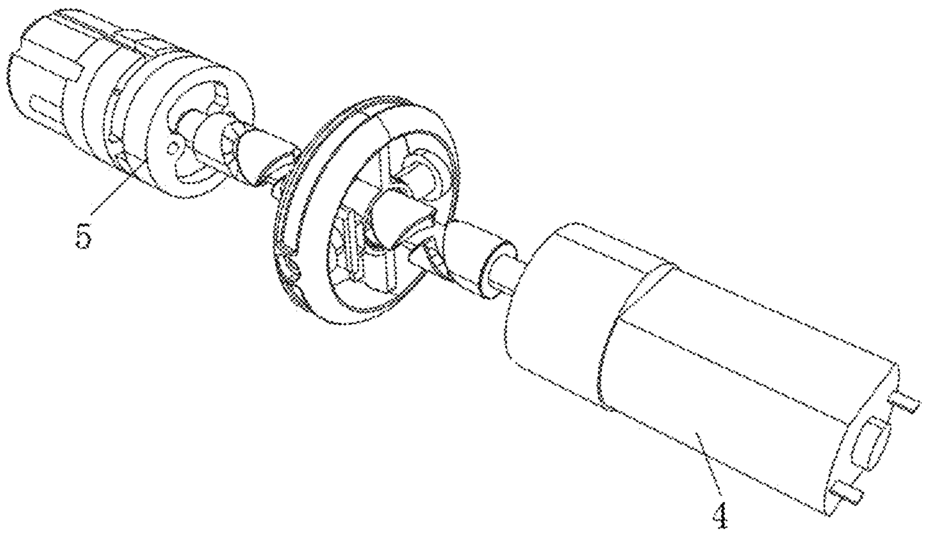
FIG. 11 shows a structural schematic diagram of the reciprocating component and the second massage component in accordance with some embodiments of the present disclosure.

Referring to FIG. 6 and FIG. 10, in some embodiments of the present disclosure, the extension 6 is opened with a first mounting groove 61 and a second mounting groove 62 respectively at both ends, and the telescopic block 52 is inserted into the first mounting groove 61. The third massage component 7 includes a protective cover 71 and a vibration motor 72, the vibration motor 72 is provided in the protective cover 71, and the protective cover 71 is inserted into the second mounting groove 62.

Specifically, by setting the protective cover 71, this can play a protective role for the vibration motor 72. And by setting the protective cover 71 in the second mounting groove 62, so when the telescopic block 52 pushes the extension 6 to extend-retract, the extension 6 will also drive the third massage component 7 to a certain degree of extend-retract, so as the overall length of the use of the massage device can produce a certain stretch, and then through this way not only can the user vibration massage, but also through the generation of extend-retract to play the massage effect for the user. Thus the massage device has a variety of massage effects, which can effectively enhance the comfort of the user when in use the massage device.

Referring to FIG. 3 and FIG. 4, in embodiments of the present disclosure, the gripping handle 23 is provided with three openings 9 on surface, a battery 10 and a PCB board 11 are provided in the gripping handle 23, and the vibration motor 72, the servo motor 42 and the drive motor 32 are electrically connected to the PCB board 11, respectively. The PCB board 11 is provided with three control buttons on surface corresponding to the openings 9, and the three control buttons are configured to control the vibration motor 72, the servo motor 42, and the drive motor 32 respectively.

Specifically, by setting the control buttons on the surface of the PCB board 11, the vibration motor 72, the servo motor 42 and the drive motor 32 can be controlled respectively. And by setting the openings 9, it is convenient to press the control buttons, so as to facilitate the control of the massage device.

Referring to FIG. 1 and FIG. 2, the rubber sleeve 1 is provided with three control keys 12 on surface where located on the gripping part 2, and the three control keys 12 correspond to three openings 9 respectively.

Specifically, by setting the control keys 12, it is convenient to press the control buttons on the surface of the PCB board 11, so as to control the vibration motor 72, the servo motor 42, and the drive motor 32.

Referring to FIG. 1 and FIG. 2, the rubber sleeve 1 is made of non-toxic medical silicone, and the extension 6 and the impact head 35 are made of silicone.

Specifically, in this way, the massage device not only has no adverse effect on the user, but also the rubber sleeve 1 is made of silicone and the impact head 35 can enhance the comfort of the user.

In conclusion, it should be noted that the foregoing description is only some preferred embodiments of the present disclosure, and is not intended to limit the present invention. Although the present disclosure has been described in detail with reference to the foregoing embodiments, it is still possible for the person of ordinary skill in the art to modify the technical solutions recorded in the above embodiments or to make equivalent substitutions for some of the technical features therein. Any modification, equivalent substitution, improvement, etc. made within the concept and principles of the present disclosure shall be included in the scope of protection of the present invention.

What is claimed is:

1. A reciprocating massage device with swing configuration, comprising a massage body and a rubber sleeve, the rubber sleeve is provided at outside of the massage body;

wherein the massage body comprises a gripping part, a first massage component for impact vibration, a reciprocating component, a second massage component for telescoping, an extension and a third massage component;

wherein the first massage component is provided on a top of the gripping part, the reciprocating component is fitted inside the gripping part, the second massage component is provided on one end of the reciprocating component, the extension is connected with the second massage component, and the third massage component is connected with the extension;

wherein the gripping part comprises two gripping housings and two first mounting housings;

wherein the first mounting housings are provided on one end of the gripping housings, the two gripping housings are mounted to form a gripping handle, and the two first mounting housings are mounted to form a fix tube;

wherein sides of the first mounting housings are provided with first elongated slots, tops and bottoms of the first mounting housings are opened with half-arc troughs, and the half-arc troughs at the tops and the bottoms of the first mounting housings are connected to form second elongated slots running through therein after the two first mounting housings being mounted for connection;

wherein the first massage component comprises two second mounting housings mounted on tops of the two gripping housings respectively, and a drive motor is provided between the two second mounting housings;

wherein an output shaft of the drive motor is fixedly connected to an eccentric wheel, the eccentric wheel is connected to one end of a chain bar, and a second end of the chain bar extends to connect with an impact head;

wherein the reciprocating component comprises a reciprocating screw mounted between the two first mounting housings, one end of the reciprocating screw is connected with a reducer, the reducer is fixedly connected with an output shaft of a servo motor, and the servo motor is provided between the two gripping housings;

wherein a screw nut is provided on a surface of the reciprocating screw, both sides of the screw nut are fixedly attached to first joint pins respectively, a top and a bottom of the screw nut are fixedly attached to second joint pins; and wherein the fix tube is externally sleeved with a reciprocating ring, the first joint pins and the second joint pins are connected with the reciprocating ring through corresponding first elongated slot and second elongated slot, respectively.

2. The reciprocating massage device with swing configuration according to claim 1, wherein the two gripping housings, the two first mounting housings, and the two second mounting housings are fixed by screws, respectively.

3. The reciprocating massage device with swing configuration according to claim 1, wherein a connecting rod is provided on a surface of the eccentric wheel, a connector is provided at the one end of the chain bar, and the connector is opened with a first mounting hole in middle; and wherein the connecting rod is rotationally connected with the first mounting hole, the chain bar is provided with a plug connector at the second end, the impact head is provided with a plug hole at one end, and the plug connector is mounted in the plug hole.

4. The reciprocating massage device with swing configuration according to claim 3, wherein a guiding hole is formed by an end of each of the two second mounting housings when the two second mounting housings are connected, a guiding portion is provided on a surface of the chain bar, and the guiding portion is inserted in the guiding hole.

5. The reciprocating massage device with swing configuration according to claim 3, wherein the impact head is tongue-shaped or ball-shaped.

6. The reciprocating massage device with swing configuration according to claim 1, wherein the reciprocating ring comprises two half-ring bodies, the two half-ring bodies are provided with first insert rods and first sockets staggered at ends, and second sockets are opened in middle of end of the half-ring bodies; and wherein the second joint pins are provided with second insert rods at both sides, the first insert rods are inserted into the first sockets, and the second insert rods are inserted into the second sockets to make the two half-ring bodies forming a complete loop.

7. The reciprocating massage device with swing configuration according to claim 1, wherein the half-ring bodies are provided with installation blocks at inner walls, the installation blocks are provided with slots on surfaces, and the first joint pins are opened with first screw holes at one end, the first joint pins are inserted into the slots; and wherein the half-ring bodies are provided with second screw holes running through the slots on sides, the first screw holes and the second screw holes are internally threaded with fixed screws.

8. The reciprocating massage device with swing configuration according to claim 1, wherein the second massage component comprises a fixed base fixedly mounted to one end of the fix tube;

wherein one end of the fixed base is provided with a telescopic block, an installation chamber is provided inside the telescopic block, and a fixed housing is slidably provided in the installation chamber;

wherein one end of the fixed housing is fixedly connected with the fixed base, a drive screw is provided in the fixed housing, the drive screw is opened with a second mounting hole at one end, and one end of the reciprocating screw passes through the fixed base to fixedly connect with the second mounting hole;

wherein bottom of the fixed base is opened with a guide groove running through therein, a guide bar is provided on a bottom of the installation chamber, and the guide bar is slidingly connected with the guide groove; and wherein a roll groove is provided on a top of the guide bar, balls are provided in the roll groove, and the balls pass through the guide groove to rolling connect with a threaded groove on a surface of the drive screw.

9. The reciprocating massage device with swing configuration according to claim 8, wherein both sides of the telescopic block are provided with location holes, both sides of the fixed base is fixedly connected with locating rods, and the locating rods are interspersed with the location holes for connection.

10. The reciprocating massage device with swing configuration according to claim 8, wherein both ends of the extension are opened with a first mounting groove and a second mounting groove respectively, and the telescopic block is inserted into the first mounting groove; and wherein the third massage component comprises a protective cover and a vibration motor, the vibration motor is provided in the protective cover, and the protective cover is inserted into the second mounting groove.

11. The reciprocating massage device with swing configuration according to claim 10, wherein three openings are provided on a surface of the gripping handle, a battery and a PCB board are provided in the gripping handle, and the vibration motor, the servo motor and the drive motor are electrically connected to the PCB board respectively; and wherein three control buttons corresponding to the openings are provided on a surface of the PCB board, and the three control buttons are configured to control the vibration motor, the servo motor, and the drive motor respectively.

12. The reciprocating massage device with swing configuration according to claim 11, wherein three control keys are provided on a surface of the rubber sleeve located on the gripping part, and the three control keys correspond to three openings respectively.

13. The reciprocating massage device with swing configuration according to claim 3, wherein the rubber sleeve is made of non-toxic medical silicone, and the extension and the impact head are made of silicone.

* * * * *